United States Patent [19]

Guzman-Sanchez

[11] Patent Number: 5,264,121

[45] Date of Patent: Nov. 23, 1993

[54] APPARATUS FOR PURIFYING FUEL

[76] Inventor: Jorge Guzman-Sanchez, Condominios Constitucion, Edificio 24 Depto. 33, Monterrey, Nuevo Leon, Mexico

[21] Appl. No.: 755,287

[22] Filed: Sep. 5, 1991

[30] Foreign Application Priority Data

Sep. 6, 1990 [MX] Mexico ................................. 23063

[51] Int. Cl.$^5$ .................. C02F 1/40; B01D 21/00; B01D 17/032; B01D 17/028

[52] U.S. Cl. .................... 210/117; 210/119; 210/136; 210/120; 210/187; 210/533; 210/538; 210/539; 210/540; 210/801; 209/210

[58] Field of Search ............... 210/117, 119, 136, 187, 210/172, 521, 533, 538, 801, 120, 130, 540, 189, 539; 44/639; 123/1 A, 557; 209/210, 211

[56] References Cited

U.S. PATENT DOCUMENTS

| | | | |
|---|---|---|---|
| 597,822 | 1/1898 | Martin | 210/119 |
| 1,578,221 | 3/1926 | Vachier | 210/521 |
| 2,755,933 | 7/1956 | Profit | 210/119 |
| 3,875,066 | 4/1975 | Lind | 210/521 |
| 4,090,956 | 5/1978 | Benzon | 209/211 |
| 4,174,281 | 11/1979 | Dell | 210/521 |
| 4,299,696 | 11/1981 | Rosaen | 210/136 |
| 4,316,801 | 2/1982 | Cooper | 210/136 |
| 4,322,290 | 3/1982 | Carl | 210/136 |
| 4,364,822 | 12/1982 | Rich | 209/211 |
| 4,419,230 | 12/1983 | Horton | 210/119 |
| 4,424,128 | 1/1984 | Shinaver | 210/119 |
| 4,502,954 | 3/1985 | Druffel | 210/136 |
| 4,512,882 | 4/1985 | Fischer | 210/187 |
| 4,512,884 | 4/1985 | Wheatley | 210/136 |
| 4,572,783 | 2/1986 | Watson | 210/117 |
| 4,597,863 | 7/1986 | Rymal | 210/117 |
| 4,683,055 | 7/1987 | Bosch | 210/136 |
| 4,900,339 | 2/1990 | Ward | 209/211 |
| 4,915,823 | 4/1990 | Hall | 210/521 |
| 4,933,077 | 6/1990 | Wolf | 210/187 |
| 4,983,295 | 1/1991 | Lamb | 210/521 |
| 4,986,907 | 1/1991 | Uzeta | 210/187 |
| 4,997,555 | 3/1991 | Church | 210/136 |
| 5,053,120 | 10/1991 | Mollmann | 210/117 |

FOREIGN PATENT DOCUMENTS

| | | | |
|---|---|---|---|
| 3224707 | 9/1988 | Japan | 210/136 |
| 1229184 | 5/1986 | U.S.S.R. | 210/521 |

Primary Examiner—Thomas M. Lithgow
Attorney, Agent, or Firm—Abelman Frayne & Schwab

[57] ABSTRACT

An apparatus for purifying fuel, comprising a closed container having a top, a bottom, an inlet for impure fuel and an outlet for purified fuel placed at a level over the inlet, both coupled near the top of the container, a heating bulb to heat the impure fuel and allow the settlement of impurities and a valve in the bottom to remove the impurities from the container; a partition wall coupled in the container above the inlet and under the outlet, and a hollow body dependently coupled to the partition wall, defining a surrounding chamber under the partition wall to receive the impure fuel to the bottom of the container, an inner chamber in the hollow body under the partition wall, for purifying fuel, and an upper chamber over the partition wall for purified fuel; and a passage in the partition wall communicating said inner and upper chambers, to allow passage of the purified fuel to the upper chamber.

3 Claims, 2 Drawing Sheets

APPARATUS FOR PURIFYING FUEL

BACKGROUND OF THE INVENTION

A. FIELD OF THE INVENTION

This invention refers to fuel purifiers and more particularly to an apparatus for purifying diesel for internal combustion engines.

B. DESCRIPTION OF THE PREVIOUS ART

In the diesel-type internal combustion engines it is always necessary to carry out a purification step for the fuel independently from other filters of the engine and before feeding it to the engine.

The conventional purification process is normally carried out in a cylinder having inlet for impure fuel, an outlet for the purified fuel, and a heating bulb to preheat the impure fuel to reduce its viscosity and separate the solid impurities, to allow the fuel impurities to settle at the bottom of the cylinder to be discharged through a valve located at the bottom thereof and allow that the purified fuel be concentrated in an upper section of the container to be fed through its outlet to the engine.

In order to separate the inlet of impure fuel from the outlet of purified fuel, the most advanced purifiers known by the inventor include a vertical partition wall in the cylinder, defining an admission chamber connected with the inlet and a contiguous purifying chamber connected with the outlet, so that impure fuel may be fed through the inlet to the bottom of the cylinder to be heated therein and allow settlement of the fuel impurities and, as the level of fuel increases in the cylinder, allow the purified fuel to be accumulated in the upper section of the purifying chamber to be fed to the engine through the outlet of the cylinder, as is disclosed by Montemayor in his U.S. Pat. No. 4,986,907.

These purifiers have the disadvantage that, upon flooding both contiguous chambers, impure fuel will be mixed with purified fuel at the outlet passing directly to the engine because there is no real separation between the inlet and the outlet and this makes difficult the fuel admission in such a reduced chamber.

Trying to overcome the above discussed problems and disadvantages, a pipe connected with the inlet has been introduced into the cylinder, in order that the impure fuel reach directly to the bottom of the cylinder. However, this cause turbulences at the bottom of the cylinder tending to avoid settlement of the fuel impurities.

Furthermore, such purifiers have the drawback that, on discharging the impurities from the cylinder, a vacuum may be created in the cylinder giving rise to failures in the suction side of the feeding pump of the engine, and consequently in the function thereof.

To overcome all such problems and drawbacks in the purifiers of the previous art, the apparatus for purifying fuel, of the present invention, includes a partition wall coupled above the inlet and under the outlet in the container and a hollow body dependently coupled to said partition wall, defining three completely separate chambers, a surrounding one between the container and the hollow body communicated with the inlet, wherein fuel is admitted and forced to the bottom, an inner one in the hollow body, for purifying fuel, and an upper one over the partition wall, in communication with the inner one, preferably through a passage having check valve, to allow the passage of purified fuel floating in the upper part of the inner chamber to the upper chamber and avoid flowback of purified fuel, and which is also connected to the outlet to feed the purified fuel to the engine.

Also, the problem of forming a vacuum at the outlet of fuel is overcome because said check valve avoids any vacuum which could be formed in the lower chamber when the impurities are discharged from the equipment, from passing to the upper chamber.

Furthermore, because of the characteristics of the apparatus of the present invention, duly dimensioned, can be useful for separating fuel from water in cases such as fuel leaks in the ocean.

SUMMARY OF THE INVENTION

It is therefore a main objective of the present invention, to provide an apparatus for purifying fuel, having an inlet for impure fuel separated from the outlet for purified fuel, to avoid the purified fuel from being recontaminated.

It is also a main objective of the present invention, to provide an apparatus for purifying fuel, of the nature above disclosed, comprising a hollow closed container including a partition wall coupled in the container, having a hollow body dependently coupled to said partition wall defining three separate and isolated chambers in said container, a surrounding chamber for admitting and forcing the fuel to the bottom of the container, an inner chamber for purifying fuel and an upper chamber communicated with the inner chamber through a passage, to allow passage of the purified fuel from the inner chamber to the upper chamber, avoid the impure fuel of the lower chamber to contaminate the purified fuel of the upper chamber and avoid flowback of the purified fuel.

It is a further main objective of the present invention, to provide an apparatus for purifying fuel of the nature above disclosed, which cam be used for separating fuel from water in cases such as fuel leaks in the ocean.

These and other objectives and advantages of the present invention will be apparent to the persons skilled in the art, from the following detailed description of the invention, provided in combination with the accompanying drawings.

DETAILED DESCRIPTION OF THE INVENTION

Figure 1:
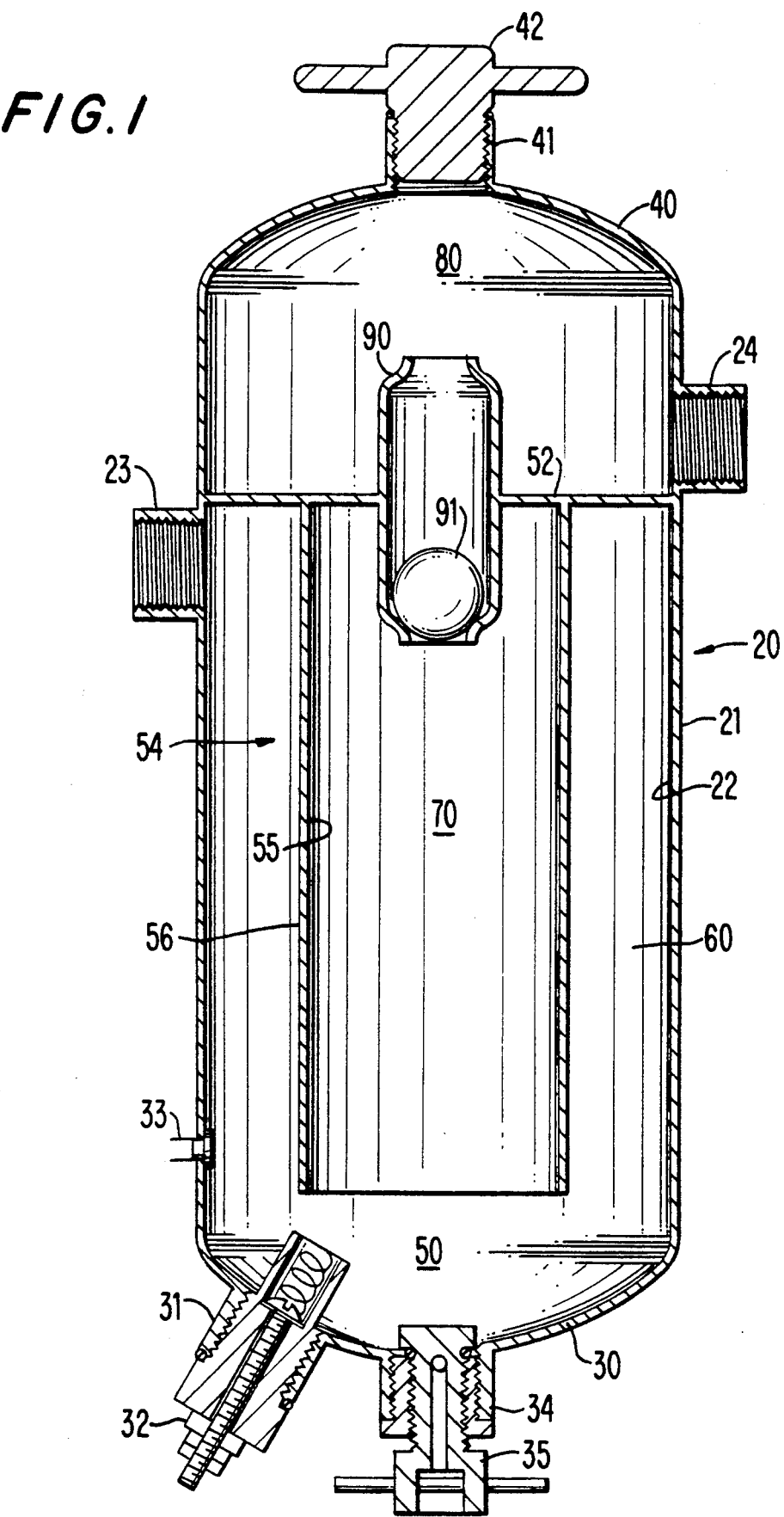
FIG. 1, is a longitudinal section view of an embodiment of the apparatus for purifying fuel of the present invention.
Figure 2:
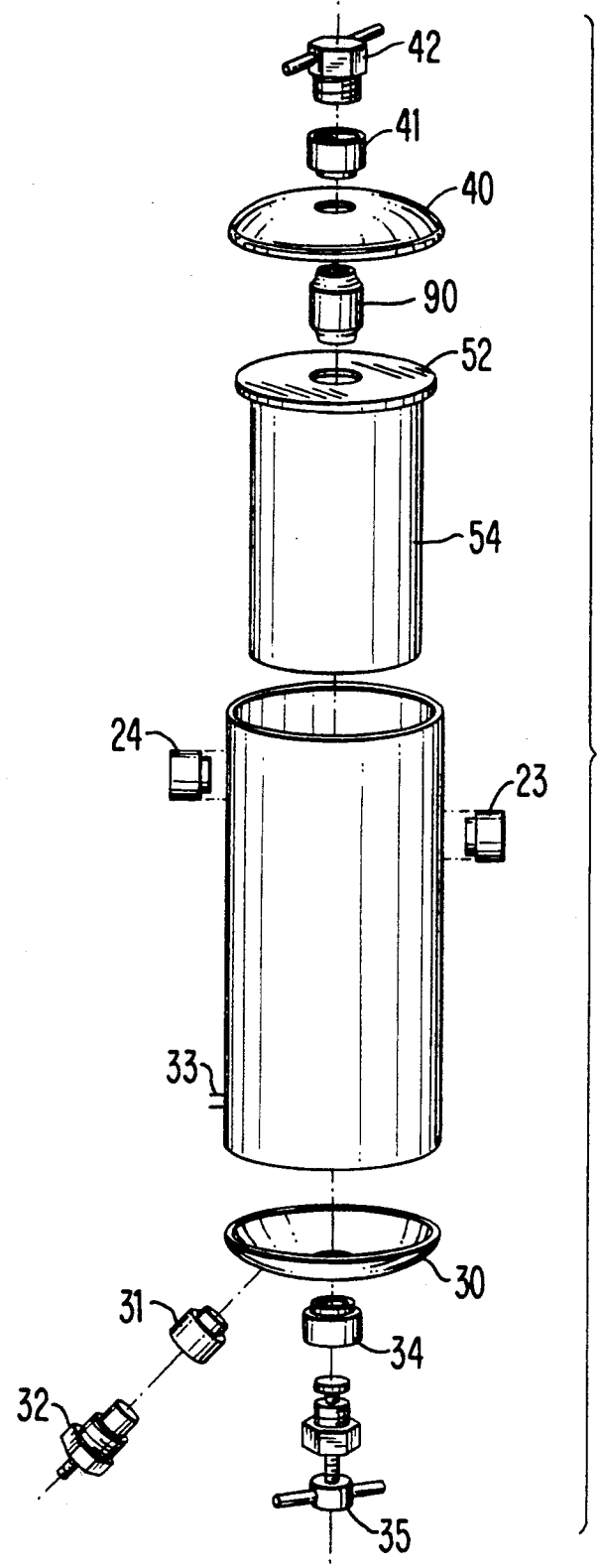
FIG. 2, is a detailed exploded view of the embodiment of the apparatus illustrated in FIG. 1.

In accordance with a specific embodiment of the present invention illustrated in the appended FIGS. 1 and 2, the apparatus for purifying fuel, comprising:

a hollow closed cylindric container 20 having an outer wall 21 and an inner wall 22, an hemispheric bottom 30 and an hemispheric top 40 defining a plenum chamber 50;

the hemispheric bottom 30 has a coupling 31 for a heater 32 to heat the fuel into the chamber 50, reduce its viscosity and allow settlement of the fuel impurities, a connector 33 for an alarm such as temperature alarm (not illustrated) and a coupling 34 having a valve 35 for discharging accumulated impurities settled in said bottom 30;

the hemispheric top 40 has A threaded coupling 41 centrally coupled to its upper end, including a valve 42 to check the level of fuel therein;

a tubular inlet 23 for impure fuel, coupled to the container 20 near the top 40, to be connected to a source of impure fuel and a tubular outlet 24 the for purified fuel, coupled at a level over the inlet 23, near the top 40, to be coupled to the fuel admission of the engine;

a circular partition wall 52 coupled in the container 20 near the top 40 above the inlet 23 for impure fuel and under the outlet 24 for purified fuel, and a bottom opened tubular hollow body 54 depending coupled to said partition wall 52, having an inner wall 55 and an outer wall 56 defining an outer peripheral chamber 60 between the outer wall 56 of said hollow body 54 and the inner wall 22 of said container 20, for admission of impure fuel to the bottom 30 of said container 20, an inner chamber 70 under the partition wall 52, for purifying the fuel, and an upper chamber 80 over the partition wall 52 for purified fuel; and a passage 90 in the partition wall 52, having a check valve 91, communicating said inner chamber 70 and said upper chamber 80, to allow the purified fuel to pass from the lower chamber 70 to the upper chamber 80, preventing flowback of the fuel to the inner chamber 70.

In this way, a suitable admission of impure fuel through the inner chamber 70 to the bottom 30 is allowed, forcing the fuel to the bottom 30 of said container 20 to be heated therein, allow settlement of any impurities and concentrate the purified fuel in the inner chamber 70 which, upon filling, allows the passage of purified fuel to the upper chamber 80 through the passage 90 to be fed to the fuel feeding equipment of the engine.

And last but not least, although in this disclosure reference is made to a cylindric container and to hemispheric bottom and top, as well as tubular inlets and outlets, any of these elements may have any other suitable shape or form.

Furthermore, reference is made to an specific embodiment of a check valve, but this can be substituted by any other kind of valve complying with the required functions and even, if it is considered to be proper, thus can be eliminated.

Therefore it has to be understood that this invention is not limited to the disclosed specific embodiment and that the persons skilled in the art will be able from the teachings of this invention, to introduce changes in the design and distribution of the components of the apparatus of this invention, which will fall within the scope of inventive concept claimed in the following.

What claimed is:

1. A separator apparatus for the searation of particulate matter from contaminated fuel, said apparatusa comprising:

a hollow cylidrical container defining an axis and having a closed top and bottom;

a generally circular partition wall coupled to said container near the top thereof and defining an upper chamber above the wall and a lower chamber below the wall;

an open bottomed hollow cylindrical body having a diameter less than the diameter of said container and said body being coupled to the partition wall and extending downwardly therefrom into said lower chamber to a location spaced from the bottom of said container thereby defining an outer annular chamber between the body and the container, an inner chamber located inside of the hollow body, and a communication chamber which is below the body and above the bottom of the container; said communication chamber is in direct fluid communication with said annular chamber and said inner chamber;

inlet means for feeding contaminated fuel into said upper end of said annular chamber in a radial direction to said container axis;

passageway means in said partition wall which connects the inner chamber with the upper chamber, said passageway means incldes check valve means for preventing reverse flow from said upper chamber to said inner chamber; and upper outlet means located above the inlet means and in flow communication with the upper chamber and extending to outside of the container for discharging purified fuel from said container.

2. The apparatus as claimed in claim 1, wherein said container includes means to heat the fuel to allow the fuel to easily separate from the particulate matter.

3. The apparatus as claimed in claim 1, wherein the top of the container includes a pressure relief valve.

* * * * *